US006969479B2

(12) United States Patent
Gorman et al.

(10) Patent No.: US 6,969,479 B2
(45) Date of Patent: Nov. 29, 2005

(54) TOOLING WITH HELICAL COILS FOR STRUCTURED SURFACE ARTICLES

(75) Inventors: Michael R. Gorman, Lake Elmo, MN (US); Thomas R. LaLiberte, Eagan, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 45 days.

(21) Appl. No.: 10/780,078

(22) Filed: Feb. 17, 2004

(65) Prior Publication Data

US 2004/0159970 A1 Aug. 19, 2004

Related U.S. Application Data

(62) Division of application No. 10/024,919, filed on Dec. 18, 2001, now Pat. No. 6,767,202.

(51) Int. Cl.[7] .............................................. B29C 43/46
(52) U.S. Cl. .................................. 264/167; 264/210.2
(58) Field of Search ............................... 264/167, 166, 264/210.2, 284

(56) References Cited

U.S. PATENT DOCUMENTS

| | | | | | |
|---|---|---|---|---|---|
| 2,570,470 | A | * | 10/1951 | Meyer et al. | 69/37 |
| 2,793,585 | A | * | 5/1957 | Granitsas | 101/28 |
| 3,007,231 | A | * | 11/1961 | Garver | 29/895.211 |
| 3,192,589 | A | | 7/1965 | Pearson | |
| 3,541,216 | A | * | 11/1970 | Rochlis | 264/293 |
| 3,828,998 | A | * | 8/1974 | Gross | 26/105 |
| 4,149,303 | A | * | 4/1979 | Appenzeller | 492/35 |
| 4,192,050 | A | * | 3/1980 | Appenzeller | 29/895.211 |
| 4,272,865 | A | | 6/1981 | Schmolke | |

(Continued)

FOREIGN PATENT DOCUMENTS

| | | |
|---|---|---|
| JP | 55158925 | 12/1980 |
| WO | WO 97/45127 | 12/1997 |
| WO | WO 98/14086 | 4/1998 |
| WO | WO 98/30381 | 7/1998 |
| WO | WO 98/57564 | 12/1998 |
| WO | WO 98/57565 | 12/1998 |

*Primary Examiner*—Mark Eashoo
(74) *Attorney, Agent, or Firm*—William J. Bond

(57) ABSTRACT

Tool rolls and methods of using the tool rolls to manufacture articles with one or more structured surfaces are disclosed. The tool rolls include an outer surface that, when used in connection with materials of the proper viscosity or formability, can form a structured surface on an article. Because the tools are manufactured in roll-form, they can be advantageously used in continuous manufacturing processes. Alternatively, discrete articles may be processed using the tool rolls. The tool rolls are constructed of a cylindrical base roll and are wrapped with one or more continuous wires in a modified undulating helical pattern. The modified helical pattern results in the distance between the first wire and a reference plane transverse to the longitudinal axis of the base roll sequentially increasing and decreasing at least once when moving in one direction about a circumference of the base roll. The wires are used, in essence, to form a structured surface on the tool roll that is the negative of the structured surface to be formed on the articles processed using the tool roll. One or more of the wires wound around the base roll may include a plurality of voids formed therein that, when wound about the base roll, form a plurality of mold cavities on the outer surface of the tool roll. Alternatively, the helical pattern of one or more wound wires may be used to form a continuous helical structured surface, e.g., a helical groove or grooves.

11 Claims, 8 Drawing Sheets

U.S. PATENT DOCUMENTS

| | | | | |
|---|---|---|---|---|
| 4,438,547 | A * | 3/1984 | Schmolke et al. | 19/98 |
| 4,537,096 | A | 8/1985 | Hollingsworth | |
| 4,775,310 | A | 10/1988 | Fischer | |
| 5,077,870 | A | 1/1992 | Melbye et al. | |
| 5,792,411 | A | 8/1998 | Morris et al. | |
| 5,845,375 | A | 12/1998 | Briggs | |
| 5,887,470 | A | 3/1999 | Mirtsch | |
| 6,190,594 | B1 | 2/2001 | Gorman et al. | |
| 6,767,202 | B2 * | 7/2004 | Gorman et al. | 425/363 |

* cited by examiner

TOOLING WITH HELICAL COILS FOR STRUCTURED SURFACE ARTICLES

This is a divisional of application Ser. No. 10/024,919, now U.S. Pat. No. 6,767,202.

FIELD OF THE INVENTION

The present invention relates to the field of manufacturing articles with structured surfaces. More particularly, the present invention provides tooling with undulating helical coils for manufacturing articles with one or more structured surfaces and methods of using the tooling to manufacture articles with one or more structured surfaces.

BACKGROUND

Articles with one or more structured surfaces find a variety of uses. The articles may be provided as films that exhibit, e.g., increased surface area, structures used to provide a mechanical fastener, optical properties, etc. When these films are manufactured for use as mechanical fasteners, the protrusions that are found on the structured surface are commonly referred to as hooks. The hooks may be formed in a curved shape or they may be substantially upright stems that are deformed in a subsequent operation to include, e.g., a head in the shape of mushroom.

Mechanical fasteners are sometimes designed so that two hook strips can be used to fasten two articles together by adhering each strip to one of the articles and then interengaging the two strips. Such a mechanical fastener is shown in U.S. Pat. No. 3,192,589 (Pearson) which calls the fastener "hermaphroditic" because its headed studs have both male and female characteristics when intermeshed. The Pearson fasteners can be made by molding a base from which integral headless studs project and then heat softening the tips of the studs.

U.S. Pat. No. 5,077,870 (Melbye et al.) discloses one method of manufacturing the hook strip portion of a mechanical fastener by forcing molten material into cavities formed in a moving mold surface. The stems formed by the moving mold surface are then capped to form the desired fasteners. The cavities are formed in the mold surface by drilling. As a result, the cavities are cylindrical in shape and, although some precision can be obtained in depth, diameter and spacing between cavities, it is obtained with some difficulty and increased costs. Furthermore, damage to the mold surface typically requires that the entire mold be discarded.

U.S. Pat. No. 5,792,411 (Morris et al.) discloses a molding tool manufactured by laser machining a mold surface. Molten material is then forced into the cavities in the moving mold surface to form stems. The stems are then capped to form the desired fasteners. Because the cavities are formed by laser ablation, the cavity shape is based on the energy distribution within the laser beam used to form the cavities. Furthermore, precise control over the depth of the cavities is difficult to obtain due to variability in the material used to construct the mold, the power of the laser beam, the energy distribution within the beam, beam focus, etc.

U.S. Pat. No. 4,775,310 (Fischer) and PCT Publication No. WO 97/46129 (Lacey et al.) disclose tooling used to manufacture hook strips for a hook-and-loop style mechanical fastener. The tools are formed by a hollow drum with a water cooling jacket. A series of mold disks or alternating mold disks and spacer plates are laminated together along the length of the drum to form the desired mold cavities on the face of the roll. Disadvantages of these designs include the cost of manufacturing the mold disks with adequate precision to ensure that the mold cavities are of the same depth, length, spacing, etc. Size limitations imposed on the disks by manufacturing difficulties can, in turn, limit line speed in processes using the tools. Other disadvantages of this design include non-uniform cooling of the mold cavities, non-uniformities in the products produced by the stacked plates, etc.

SUMMARY OF THE INVENTION

The present invention provides tool rolls and methods of using the tool rolls to manufacture articles with one or more structured surfaces. The tool rolls include an outer surface that, when used in connection with materials of the proper viscosity or formability, can form a structured surface on an article. Because the tools are manufactured in roll-form, they can be advantageously used in continuous manufacturing processes. Alternatively, discrete articles may be processed using the tool rolls of the present invention.

By "structured surface" it is meant that a surface of the article deviates from a planar or other smooth surface. For example, the structured surface may include protrusions extending therefrom, such as stems used in connection with mechanical fasteners. Other alternative structured surfaces include, but are not limited to: continuous grooves or ridges, elongated structures, etc.

The tool rolls of the present invention are constructed of a cylindrical base roll and are wrapped with one or more continuous wires in an undulating helical pattern. The wires are used, in essence, to form a structured surface on the tool roll that is the negative of the structured surface to be formed on the articles processed using the tool roll. In one embodiment, at least one of the wires wound around the base roll may include a plurality of voids formed therein that, when wound about the base roll, form a plurality of mold cavities on the outer surface of the tool roll. Alternatively, the one or more wound wires may be used to form a continuous structured surface, e.g., a continuous groove or grooves.

The undulating helical coils formed by the wires in tool rolls of the present invention present a profile or shape such that the distance between a reference plane transverse to the longitudinal axis of the base roll and the wire or wires sequentially increases and decreases at least once when moving in one direction about a circumference of the base roll. As a result, although the wire or wires wrapped about the base roll progress across the face of the roll, they undulate to provide the desired varying distance between to the reference plane. The undulating helical pattern formed by the wire or wires may be provided by a winding surface proximate the end or ends of the base roll.

Advantages of this undulating helical winding design may include, for example, more even distribution of wear on any surfaces (e.g., a nip roll) against which the tool roll is biased during operation. Another potential advantage may be found in varying the orientation of any mold cavities (relative to the machine direction) formed in the tool roll by the wound wire or wires. Any protrusions formed in a structured article by the mold cavities may then also vary in their orientation relative to the machine direction. Yet another potential advantage of the undulating helical winding on tool rolls of the present invention is that rotation of the windings relative to the base roll may be inhibited.

Other advantages of the tool rolls include, but are not limited to the ability to replace the wire windings on the base roll if the outer surface of the tool roll becomes damaged or worn. The tool rolls may also be relatively inexpensive as compared to the cost of manufacturing tool rolls using, e.g., stacked plates or direct drilling of the mold surface.

Another advantage is the ability to control the spacing between mold cavities along the width of the roll by varying the thickness of the wire or wires wrapped around the base roll. Spacing of the mold cavities about the circumference can also be independently controlled by controlling the spacing between voids in the wire or wires wrapped around the base roll. A further advantage is that, by controlling the profile or cross-sectional shape of the wire or wires and the shape or shapes of the voids formed in the wire, variations in the shape or shapes of the mold cavities can also be achieved.

Yet another advantage of the present invention is the relatively small thermal mass of the wire or wires wrapped around the base roll in comparison to the thermal mass of the base roll. As a result, thermal control over the mold cavities can be improved, which can result in corresponding improvements in the uniformity of the products produced using the tool rolls.

As used in connection with the present invention, a "mold cavity" may be any discontinuity in an otherwise smooth or planar surface into which moldable material may flow during a molding process. In some embodiments of the present invention, the tool rolls may include mold cavities with high aspect ratios as defined below, although it should be understood that a mold cavity need not have a high aspect ratio.

In one aspect, the present invention provides a tool roll including a cylindrical base roll having first and second ends spaced apart along a longitudinal axis; and a first wire with a plurality of first voids formed therein, the first wire being wound in helical coils around the base roll, wherein the plurality of first voids in the first wire form a plurality of first cavities, each cavity of the plurality of first cavities including an opening at an outer surface of the tool roll; wherein a distance between the first wire and a reference plane transverse to the longitudinal axis of the base roll sequentially increases and decreases at least once when moving in one direction about a circumference of the base roll.

In another aspect, the present invention provides a tool roll including a cylindrical base roll having first and second ends spaced apart along a longitudinal axis; a first wire with a plurality of first voids formed therein, the first wire being wound in helical coils around the base roll; a second wire wound around the base roll, wherein the second wire is located between adjacent helical coils of the first wire; wherein the second wire and the plurality of first voids in the first wire form a plurality of first cavities, each cavity of the plurality of first cavities including an opening at an outer surface of the tool roll; and wherein a distance between the first wire and a reference plane transverse to the longitudinal axis of the base roll sequentially increases and decreases at least once when moving in one direction about a circumference of the base roll.

In another aspect, the present invention provides a method of forming a structured surface on an article by providing a tool roll including a cylindrical base roll having first and second ends spaced apart along a longitudinal axis, a first wire with a plurality of first voids formed therein, the first wire being wound in helical coils around the base roll, wherein the plurality of first voids in the first wire form a plurality of first cavities, each cavity of the plurality of first cavities including an opening at an outer surface of the tool roll, wherein a distance between the first wire and a reference plane transverse to the longitudinal axis of the base roll sequentially increases and decreases at least once when moving in one direction about a circumference of the base roll. The method also includes contacting a moldable material to the outer surface of the tool roll to form the structured surface using the outer surface of the tool roll, the moldable material at least partially filling at least some of the first cavities; and removing the structured surface from the outer surface of the tool roll, wherein the structured surface includes a plurality of protrusions corresponding to the plurality of first cavities.

In another aspect, the present invention provides a method of forming a structured surface on an article by providing a tool roll including a cylindrical base roll having first and second ends spaced apart along a longitudinal axis, a first wire wound in helical coils around the base roll, wherein a distance between the first wire and a reference plane transverse to the longitudinal axis of the base roll sequentially increases and decreases at least once when moving in one direction about a circumference of the base roll, a second wire wound in helical coils around the base roll, wherein the second wire is located between adjacent helical coils of the first wire, and wherein the helical coils of the first and second wires alternate along the longitudinal axis, and further wherein a height of the first wire above the base roll is less than a height of the second wire above the base roll, whereby a helical groove is formed on an outer surface of the tool roll, the helical groove conforming to the shape of the first wire. The method further includes contacting a moldable material to the outer surface of the tool roll to form a structured surface on an article using the outer surface of the tool roll, the moldable material at least partially filling at least a portion of the helical groove formed by the first and second wires; and removing the structured surface from the tool roll, wherein the structured surface includes a series of ridges.

These and other features and advantages of the present invention are described below in connection with illustrative embodiments of the present invention.

DETAILED DESCRIPTION OF ILLUSTRATIVE EMBODIMENTS OF THE INVENTION

The present invention provides tool rolls and methods of using the tool rolls to manufacture articles with one or more structured surfaces. The tool rolls include an outer surface that, when used in connection with materials of the proper viscosity or formability, can form a structured surface on an article. Because the tools are manufactured in roll-form, they can be advantageously used in continuous manufacturing processes to form e.g., films, sheets, etc. Alternatively, discrete articles may be processed using the tool rolls of the present invention.

The tool rolls of the present invention may include a plurality of cavities in their outer surfaces that, when used in connection with materials of the proper viscosity or formability, can form protrusions or structures on at least one surface of a film. Alternatively, two such rolls can be used in combination to form a film in which both major surfaces exhibit protrusions or structures.

Figure 1:
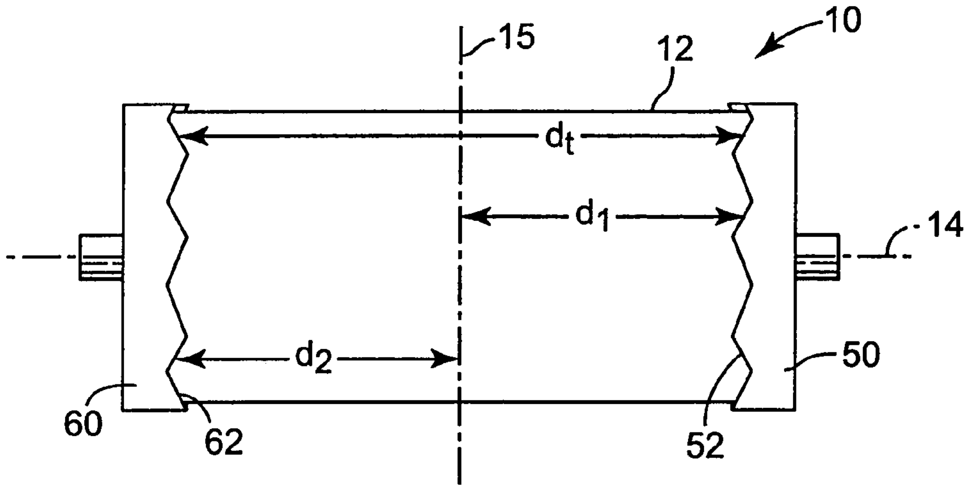
FIG. 1 is a plan view of one tool roll according to the present invention.

FIGS. 1–4 depict one illustrative embodiment of the tool roll 10 according to the present invention. FIG. 1 depicts the cylindrical base roll 12, a first end cap 50 and a second end cap 60. The first end cap 50 is located proximate a first end of the cylindrical base roll 12. The second end cap 60 is located proximate a second end of the cylindrical base roll 12. The cylindrical base roll 12 also defines a longitudinal axis 14 about which the tool roll 10 is rotated during use.

Figure 2:
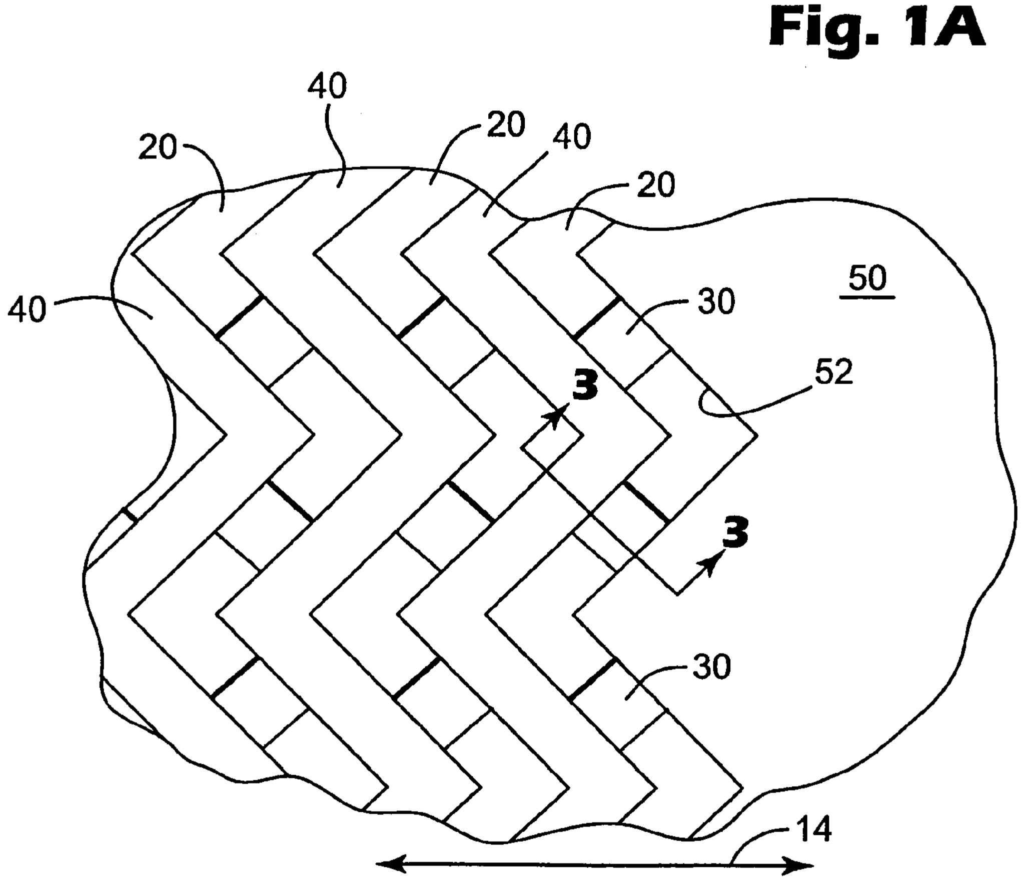
FIG. 2 is an enlarged view of a portion of the surface of the tool roll of FIG. 1 illustrating the cavities formed therein.
Figure 3:
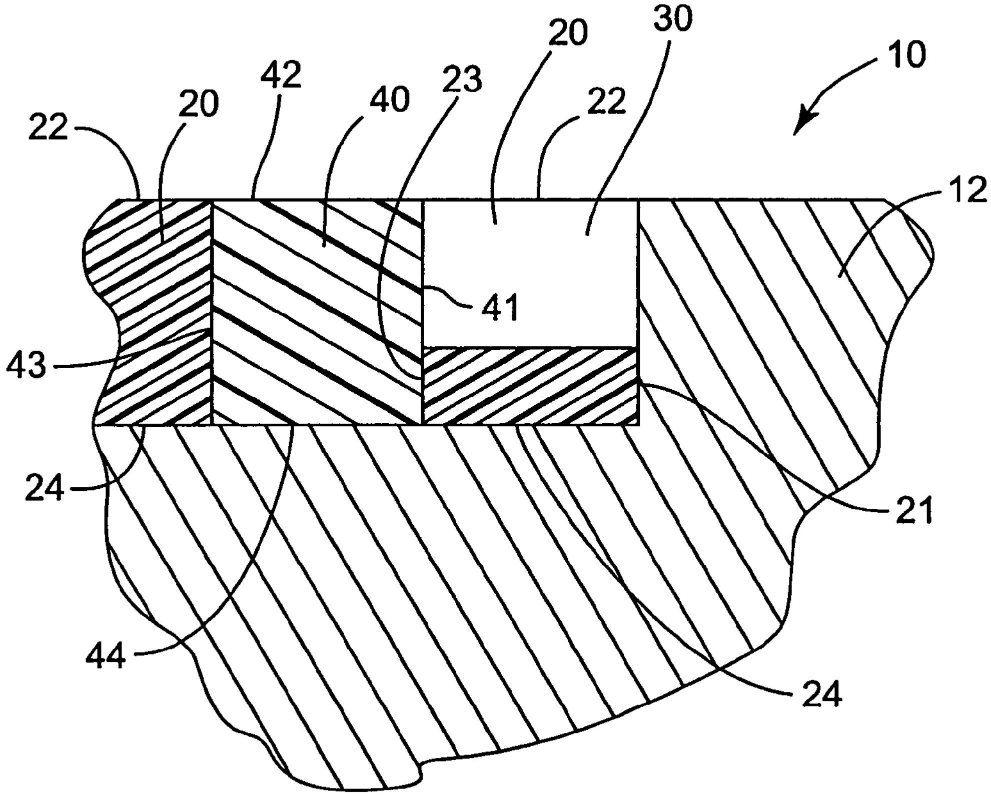
FIG. 3 is an enlarged cross-sectional view of the tool roll of FIG. 2, taken along line 3—3 in FIG. 2.
Figure 4:
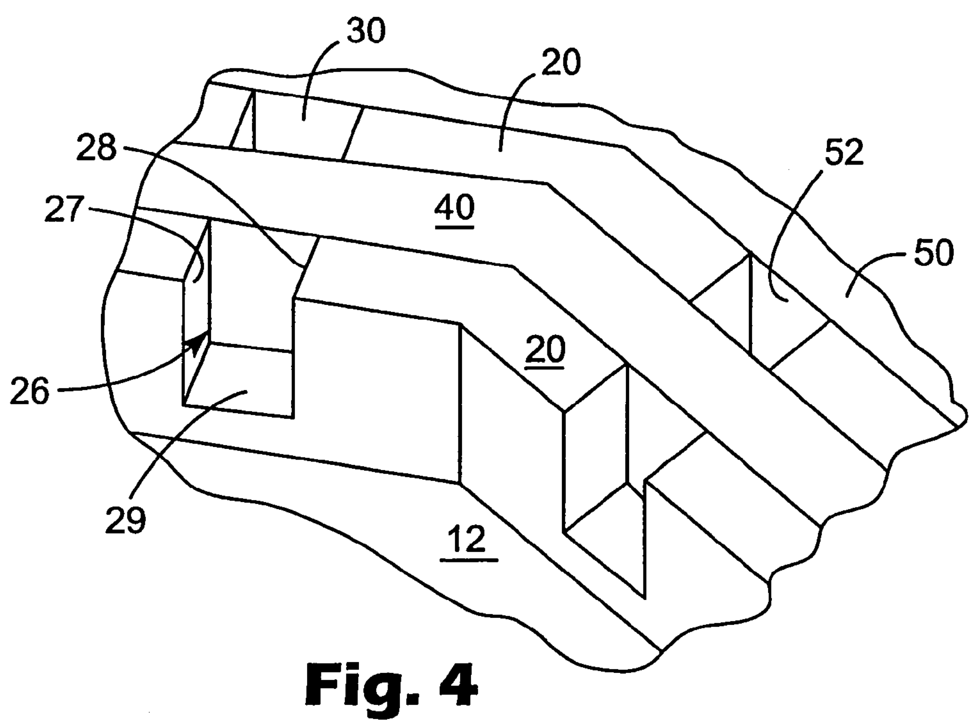
FIG. 4 is an enlarged cut-away perspective view of a portion of the surface of the tool roll of FIG. 2 illustrating the cavities formed therein.

FIG. 2 is an enlarged view of a portion of the surface of the tool roll 10 with wires 20 and 40 wrapped around the base roll 12 (not shown in FIG. 2). The cavities 30 formed by the wires 20 and 40 are also depicted in FIG. 2. FIG. 3 is a cross-sectional view of a portion of the tool roll 10 depicting the base roll 12, wires 20 and 40, and end cap 50. FIG. 4 is a perspective view of wires 20 and 40 illustrating formation of the cavities in the tool roll 10.

The wires 20 and 40 wrapped around the base roll 12 may be held in place by any suitable mechanism, including, but not limited to: clamps, welding, adhesives, etc. Such techniques are known in the production of, e.g., carding rolls. See, e.g., U.S. Pat. No. 4,272,865 (Schmolke). In some instances, the end caps 50 and 60 may also serve as a part of the mechanism used to retain the wires 20 and 40 in place on the cylindrical base roll 12. In addition, it may be preferred to provide a base roll 12 that includes grooves formed in the surface on which the wires are wound, with the grooves assisting in maintaining the position of the wires wound on the base roll 12.

Returning to FIG. 1, the first end cap 50 preferably extends around the circumference of the cylindrical base roll 12 and provides a wire winding surface 52 against which a wire can be wound or wrapped in a modified helical coil. The wire winding surface 52 faces the second end of the cylindrical base roll 12 and preferably provides an undulating surface against which a wire can be formed. Many other structures or techniques can be used in place of the wire winding surface 52 to provide the desired undulating profile or shape to the modified helical coils of the wires 20 and 40. For example, a series of pins or fingers could be used to support the wires 20 and 40 in the desired undulating profile during winding on the base roll 12.

As used herein, the term "undulating" refers to the varying distance between the wires 20 (and any other wires wound with wire 20) and a reference plane extending through the cylindrical base roll 12 transverse to the longitudinal axis 14 (an edge of the reference plane 15 is depicted in FIG. 1). The distance between the reference plane 15 and the wire 20 sequentially increases and decreases at least once when moving in one direction about a circumference of the base roll 12 (distances referred to in connection with the cylindrical tool rolls of the present invention will, unless otherwise specified, be measured parallel to the longitudinal axis 14 of the cylindrical base roll 12). As a result, the distance represented by $d_1$ increases and decreases at least once as one moves about the circumference of the base roll 12. This is in contrast to a conventional helical pattern in which the distance would either increase or decrease when moving in one direction about the circumference of the base roll 12, but not both increase and decrease when moving in one direction. It will be understood that the distance between the reference plane 15 and the wire 20 will be measured along a consistent location on the wire 20 (e.g., between the sides 21 and 23 of the wire 20).

FIG. 2 depicts an enlarged portion of the surface of the tool roll 10 with wires 20 and 40 wound on the tool roll 10. The wires 20 and 40 conform to the wire winding surface 52 of the end cap 50 such that the profile of the wire winding surface 52 is replicated by each of the wires 20 and 40 as they are wound about the cylindrical base roll 12. As a result of the helical nature of the wrapped wires 20 and 40, they progress across the face of the base roll 12 from one end to the opposite end of the roll 12. Even though the modified helical coils formed by the wires 20 and 40 undulate as they progress about the circumference of the base roll 12, they do still generally progress in a helical fashion across the face of the base roll 12.

Wire 20 includes a plurality of voids formed therein, while wire 40 acts as a spacer between the coils of wire 20. The result is that alternating helical coils of wire 20 and spacer wire 40 are disposed over the surface of the tool roll 10. The voids in the wire 20 and spacer wire 40 act together to define mold cavities 30 in the face of the tool roll 10. It may be preferred, but not required, that the mold cavities 30 be of the same size and be evenly-spaced about the tool roll 10. Alternatively, it may be desired that some level of non-uniformity in the size and/or spacing of the mold cavities 30 be provided.

One potential advantage of tool rolls manufactured according to the present invention is that the mold cavities 30 may vary in their orientation relative to, e.g., the longitudinal axis of the tool roll 10. For example, the mold cavities may be angled in different directions as seen in FIG. 2. In other tool rolls, the mold cavities may all be provided with the same orientation.

Referring to FIGS. 3 and 4, the inner edges 24 of the wire 20 and the inner edge 44 of the spacer wire 40 are wrapped around the base roll 12 while the outer edges 22 and 42 of the wires 20 and 40, respectively, are wound facing outward from the base roll 12. Both the wire 20 and the spacer wire 40 may preferably have rectangular cross-sections compatible with an even progression of the helical coils across the roll 10.

The voids 26 provided in the wire 20 are formed through the full width of the wire 20 and include opposing side walls 27 and 28 and bottom 29 as seen in FIGS. 3 and 4. It may be preferred that the outer edge 22 of the coils of wire 20 is even with the outer edge 42 of the spacer wire 40 such that the areas between the mold cavities 30 in the finished tool roll 10 are substantially smooth, i.e., without significant discontinuities between the wires 20 and 40.

Alternatively, the outer edges 22 and 42 of the wires 20 and 40, respectively, may be located at different heights above the surface of the base roll 12. Wires 20 and 40 with different heights can impart a structure to the surface of the article being manufactured. That structure may be in the form of elongated ridges that may provide reinforcement to, e.g., the taller protrusions formed by the mold cavities and/or the article itself.

The wire 20, including voids formed therein that provide the desired mold cavities 30 when wound around the base roll 12 as discussed above, may be manufactured using a wire or strip having a generally rectangular cross-section. The voids 26 are preferably provided through the thickness of the wire 20 such that each void includes only two sides 27 and 28 aligned along the length of the wire 20 and a bottom 29. Wire 20 may be manufactured with the voids 26 or a wire with a substantially uniform profile may first be manufactured and then processed by any suitable technique or techniques to form the voids 26 therein. The suitable technique or techniques may include, but not limited to: punching, stamping, conventional machining, laser machining, electronic discharge machining, water jet machining, etching, etc. The punching of wires to provide desired shapes is known in, e.g., the carding roll industry. See, e.g., U.S. Pat. No. 4,537,096 (Hollingsworth). The wire 20 may be manufactured from any suitable material or materials, although some preferred materials include steels, more preferably medium to low carbon steels.

In a further variation, it may be preferred that the one or more of the side surfaces of the wires 20 and/or 40, i.e., surfaces 21 and 23 of wire 20 and surfaces 41 and 43 of wire 40 (see FIG. 3), be provided with some surface texture such that the selected side surface or side surfaces are not smooth. For example, the side surface or surfaces may be embossed with a knurl pattern, ground, punched, or otherwise disrupted from a generally smooth surface. It may be preferred that any such surface texturing extend over substantially the entire side surfaces 21 and 23 of the wire 20. This surface texturing may improve filling of the cavities 30 by improving the removal of air from the cavities during processing. One example of a suitable surface texture is depicted in FIG. 4, where the sides of both wires 20 and 40 are depicted as including a pattern of knurled lines.

Figure 1A:
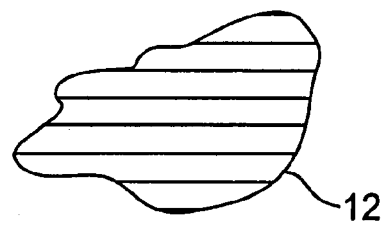
FIG. 1A is an enlarged view of a portion of the surface of base roll 12 of FIG. 1 depicting one surface texture on the surface over which wires are wound.

Referring now to FIG. 1A, another optional feature that may also be provided in connection with the tool rolls of the present invention is that the surface of the base roll 12 over which the wires are wound may also be provided with a surface texture such that the surface base roll 12 is not smooth. The surface texturing of the base roll 12 may also assist in filling of the cavities 30 by providing additional paths through which entrapped air can escape. The surface texturing may also reduce rotational shifting of the wound wires relative to the base roll 12 during use. One example of a suitable surface texture may be a pattern of substantially parallel knurled lines formed in the surface of the base roll 12 as depicted in the enlarged view of FIG. 1A.

Figure 5:
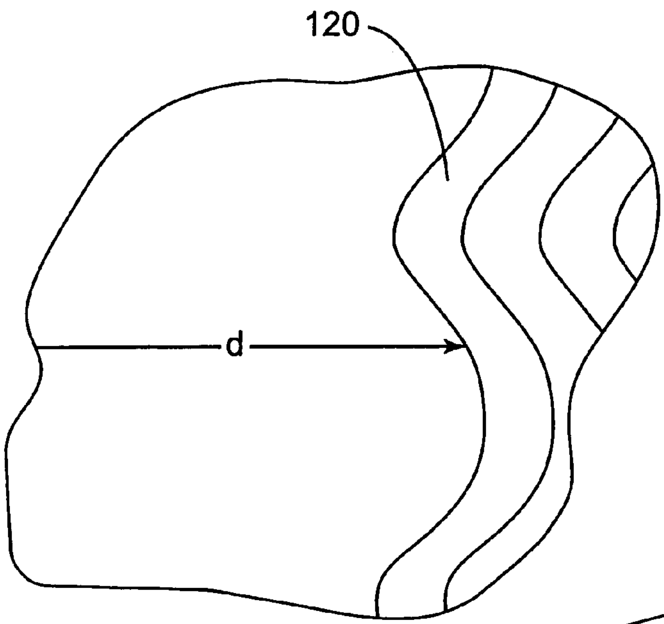
FIG. 5 is a schematic diagram of one alternative undulating helical coil profile that may be used in a tool roll of the present invention.
Figure 6:
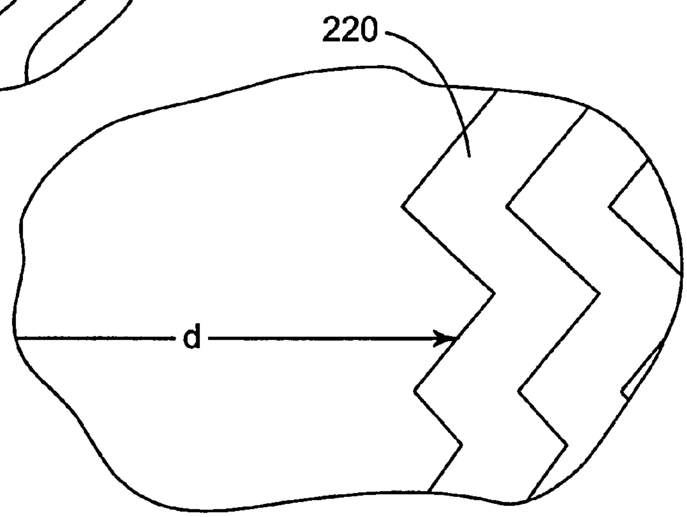
FIG. 6 is a schematic diagram of another alternative undulating helical coil profile that may be used in a tool roll of the present invention.

Although the undulating helical wire coil profile depicted in FIGS. 1 and 2 is in the form of a uniformly varying profile in both pitch and amplitude, it should be understood that any profile that provides a varying distance between the wires and a reference plane extending through the cylindrical base roll 12 transverse to the longitudinal axis 14 may be used. Examples of some alternative profiles are depicted in FIGS. 5 and 6, although the depicted examples are not exhaustive of the potential profiles that may be used in connection with the present invention.

Referring to FIG. 1, a second end cap 60 may also preferably provide a wire winding surface 62 with a profile or shape that is complementary to the shape or profile of the wire winding surface 52 on the opposing end of the base roll 12. Similar to the wire winding surface 52, the wire winding surface 62 can be characterized as being located a distance $d_2$ from the reference plane 15 that varies around the circumference of the base roll 12. If the second wire winding surface 62 is complementary to the first wire winding surface 52, then the distance d between the two wire winding surfaces 52 and 62 is fixed or unchanging around the circumference of the base roll 12.

The undulating profile depicted in FIGS. 1 and 2 may be characterized as providing a distance $d_1$ between the reference plane 15 and the wire 20 that sequentially increases and decreases about the circumference of the base roll 12. Such a pattern may be described as a series of alternating, sequential peaks and valleys when moving in one direction about the circumference of the base roll 12. Each coil formed by the wires includes at least one peak and at least one valley.

Although the undulating helical coils depicted in FIGS. 1 and 2 are formed by sequential peaks and valleys connected by line segments, the profiles of the modified helical coils and associated wire winding surfaces (if provided) may include other shapes. For example, FIG. 5 depicts another example of a pattern of sequential increases and decreases in the distance d between a reference plane and a wire 120 about the circumference of a base roll. The profile depicted in FIG. 5 may be characterized as sinusoidal and although the depicted pattern is uniform with respect to amplitude and frequency, it will be understood that non-uniformities with respect to one or both of amplitude and frequency may be provided if so desired.

Furthermore, it should be understood that the undulating helical coils used in connection with the present invention may combine straight line segments and/or curves in any desired manner that accomplishes the goal of obtaining an undulating helically wound wire that provides a varying distance from a reference plane. FIG. 6 depicts one illustrative profile in which the wire 220 has been crimped or otherwise processed to provide more pronounced transitions in direction from the curved profiles depicted in FIGS. 1, 2, and 5.

Figure 7:
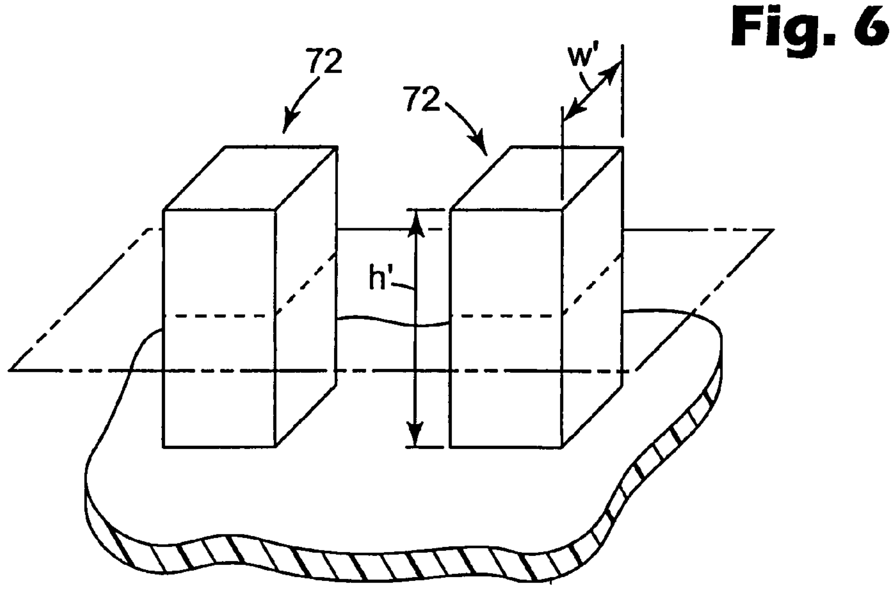
FIG. 7 is an enlarged perspective view of a structured surface formed using a tool roll according to the present invention.

One preferred application in which tool rolls manufactured according to the present invention such as tool roll 10 may be used is in the production of high aspect topology structured surfaces. Referring to FIG. 7, one illustrative article 70 formed using tool roll 10 is depicted including a structured surface having a plurality of protrusions 72 formed thereon. The illustrated protrusions have a height h' above the surface 74 of the article 70 and a minimum width w' measured in a plane I generally parallel to the plane of the surface 74. If the surface 74 has some curvature, the plane I is preferably oriented tangential to the surface 74 in the area of the protrusion 72.

The protrusions 72 may have a high aspect ratio and the tool rolls according to the present invention may be particularly advantageous in the manufacturing of structured surfaces with high aspect ratio topologies. By "high aspect ratio" it is meant that the ratio of protrusion height to minimum width (h':w') is, e.g., at least about 0.5:1 or higher, more preferably about 1:1 or higher, and even more preferably at least about 2:1 or higher. In addition to, or in place of, high aspect ratio as defined above, it may be preferred that the protrusion or structure height h' above the major surface of the article be, e.g., about 0.1 millimeters or more, more preferably about 0.2 millimeters or more, and even more preferably about 0.4 millimeters or more.

Where the article 70 is provided in sheet or film form, it may advantageously be used to manufacture mechanical fasteners (e.g., mushroom-type or hook-type mechanical fasteners). If the article 70 is used as a mechanical fastener, the protrusions 72 may commonly be referred to as stems, although use of that term is not intended to limit the scope of use for the articles manufactured using the present invention.

Although the articles that can be produced by tool rolls and methods of the present invention are advantageously used as mechanical fasteners, the articles may find a variety of other uses and the tool rolls and methods of using the tool rolls to manufacture articles with structured surfaces according to the present invention should not be limited to the field of mechanical fasteners. For example, the protrusions formed on the structured surface of an article according to the present invention may provide advantages in retaining adhesives or other coatings/materials by, e.g., increasing the surface area of the film. The structured surfaces formed by the tool rolls may also be useful for decorative purposes, as flow channels, drag reduction structures, abrasive backings, etc.

Figure 8:
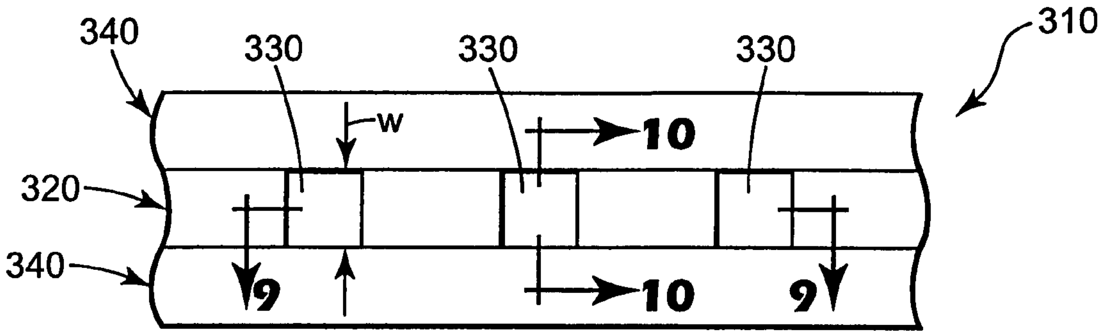
FIG. 8 is an enlarged plan view of a portion of the surface of another tool roll according to the present invention.
Figure 9:
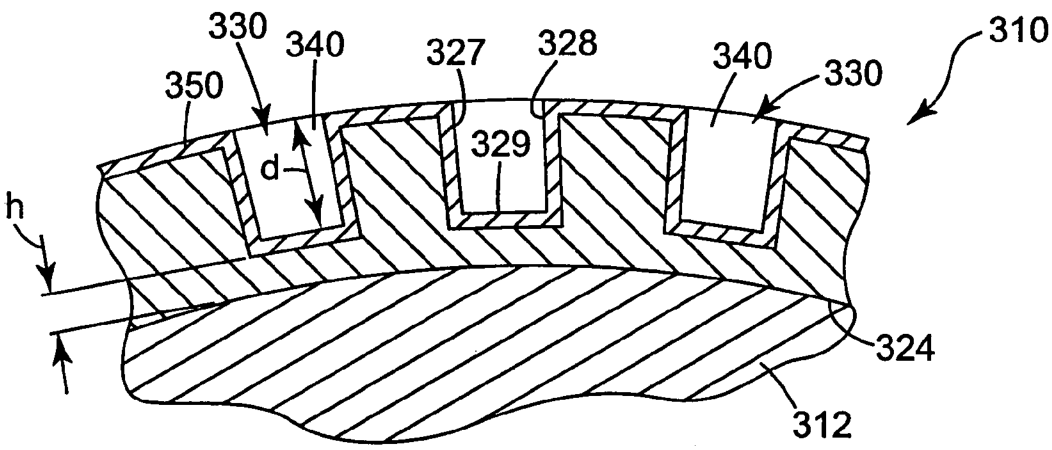
FIG. 9 is a cross-sectional view of FIG. 8 taken along line 9—9.
Figure 10:
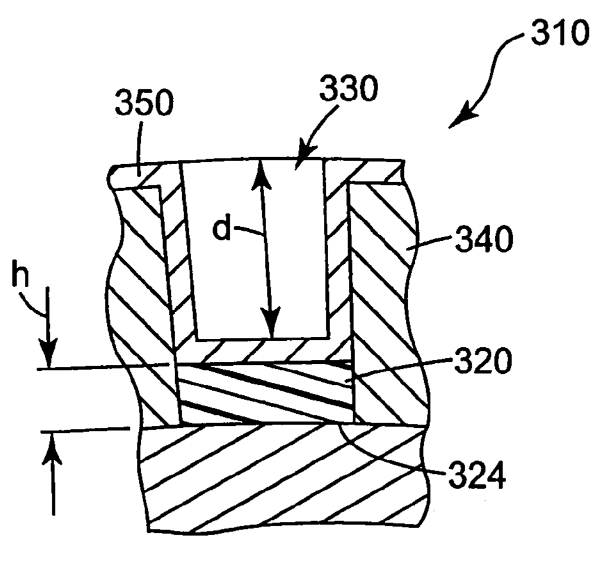
FIG. 10 is a cross-sectional view of FIG. 8 taken along line 10—10.

The mold cavities 30 illustrated in FIGS. 2–4 may have substantially uniform cross-sectional areas along their depth from the opening at the surface of the tool roll 10 to the mold cavity bottoms 29. FIG. 8 is an enlarged plan view of some similar mold cavities 330 and FIGS. 9 and 10 are cross-sectional views of the mold cavities 330 along lines 9—9 and 10—10, respectively. The mold cavities 330 exhibit generally rectilinear tangential cross-sectional areas along their depths d. By tangential, it is meant that the cross-section is taken along a tangent to the tool roll 310. By rectilinear, it is meant that the shape of the mold cavity 330 in the tangential cross-section is formed by substantially planar sides.

Sides 327 and 328 of the mold cavities 330 may be parallel or they may be formed with a draft angle such that sides 327 and 328 are farther apart at the openings of the mold cavities 330 than at the bottoms of the mold cavities 330 or vice versa.

One advantage of the tool rolls of the present invention is the ability to precisely control the height h of the bottom 329 of the mold cavities 330 above the bottom or inner surface 324 of the wire 320. The bottom 329 of the mold cavity 330 will typically correspond to the end of the mold cavity.

The preferred cylindrical base rolls 312 may be precision formed to have tightly controlled runouts. That precision runout, in combination with a tightly controlled height dimension h in the wires 320 can provide mold cavities 330 with substantially uniform depths d as measured from the outer surface of the tool roll 310. The tolerances to which the height dimension h can be controlled will generally be relatively small and the runout of the base roll 312 can be tightly controlled, resulting in overall tight tolerance control in the finished tool roll 310.

Figure 11:
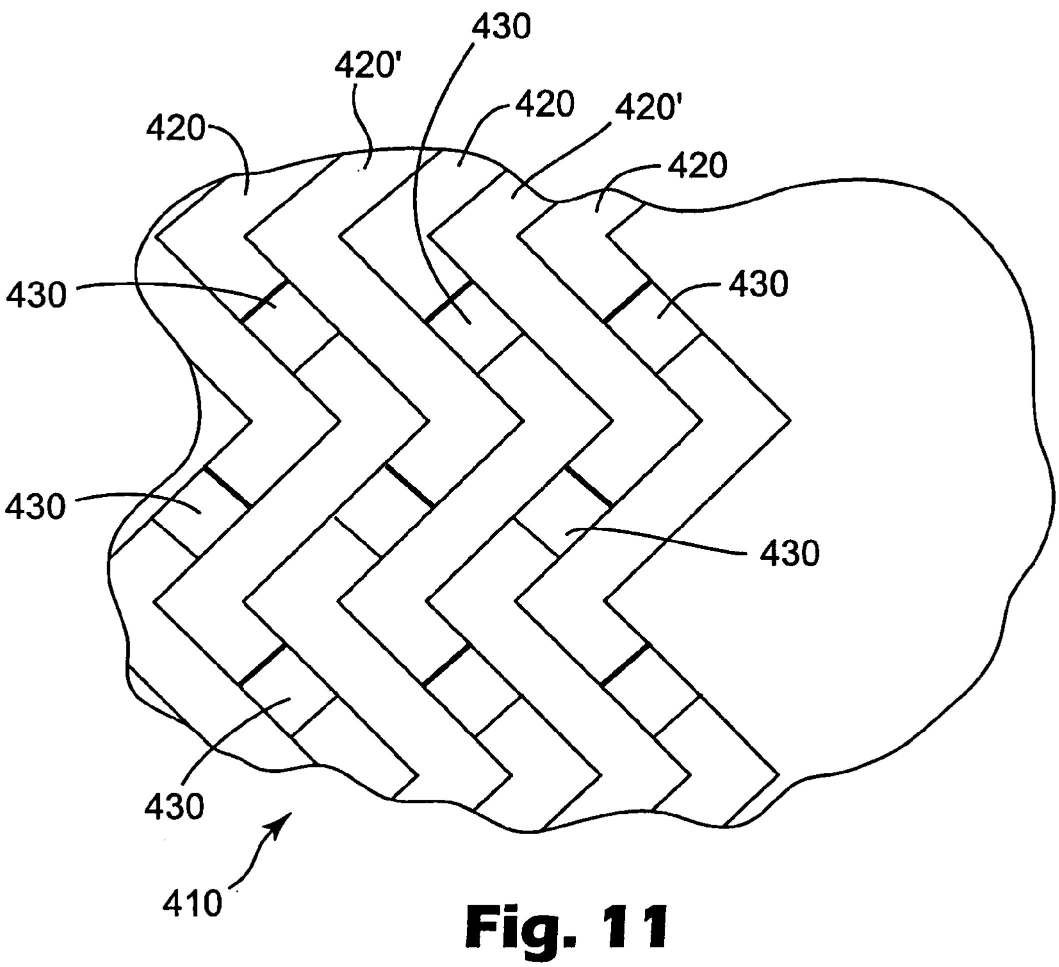
FIG. 11 is a plan view of a portion of another tool roll according to the present invention.

FIG. 11 depicts another illustrative embodiment of a tool roll 410 including a plurality of mold cavities 430 opening into an outer surface of the tool roll 410. The surface of the tool roll 410 can be wound with two wires 420 and 420', each of the wires including voids formed therein that, when wound together, form the mold cavities 430. One difference between the tool roll 410 and tool roll 10 (see, e.g., FIG. 2) is that, instead of a spacer wire 40 with a substantially uniform cross-section, the tool roll 410 includes two wires that both include voids formed therein. One advantage of the design of tool roll 410 is the ability to provide higher density mold cavities 430, i.e., reduced spacing between the mold cavities 430.

Although the illustrated tool roll 410 is preferably provided using two wires 420 and 420', it will be understood that the tool roll 410 could be produced using three or more wires. In yet another alternative, the tool roll 410 could be provided with a single wire in which case the reference numbers 420 and 420' would designate alternate windings or coils of the same wire. Such an embodiment may require tighter control over the dimensions of the wire and the base roll to prevent alignment of the mold cavities 430 formed in adjacent coils of the wire. Because that control may be difficult to achieve, it may be preferable to use two or more different wires as discussed above.

Another feature that may be used when manufacturing tool rolls of the present invention is the addition of a plating or other coating on the tool roll after winding. Such coatings are described in, e.g., U.S. Pat. No. 6,190,594 (Gorman et al.). The material or materials used in coating may vary depending on the desired physical properties. Some physical properties that may be desired include, but are not limited to increased wear resistance, controlled release characteristics, controlled surface roughness, bonding between adjacent wire windings, etc. Some preferred materials may be metal platings, more particularly an electroless nickel plating, chrome, etc.

It may be desirable to machine the outer surface of the tool roll after winding the wire or wires to provide improved runout in the finished tool roll. The machining may be performed before or after the addition of any plating or other coating as described above. Where the preferred wires include voids formed with a fixed height above the inner edge of the wire (as discussed in connection with FIGS. 2–4), machining the outer surface of the tool roll after winding may improve uniformity in the depth of the mold cavities.

It may also be desirable to remove any burrs remaining from, e.g., wire punching and/or machining of the wound roll, by blasting the roll with sodium bicarbonate (baking soda) or a similar material. The finished tool roll may also be processed to provide a desired surface finish within the mold cavities and/or on the outer surface of the tool roll between the mold cavities. For example, it may be desirable to grind, chemically etch, sandblast, plate, coat or otherwise modify the surfaces of the tool roll.

U.S. Pat. No. 6,190,594 (Gorman et al.) also provides example of various shapes for voids in the wires used in connection with the present invention that vary from the substantially uniform voids discussed above. One advantage of the tool rolls according to the present invention is that the voids can be formed with different shapes and/or orientations to provide mold cavities that also have different shapes and/or orientations. It will be understood that use of some of these mold cavities to produce a finished film with desired protrusions will depend on resin selections and process conditions.

In another variation, tool rolls according to the present invention may include areas in which the mold cavities differ as described in U.S. Pat. No. 6,190,594 (Gorman et al.). In one example, one or more areas may be provided with mold cavities while one or more other areas may be substantially free of mold cavities. In another example, the mold cavities in the different areas may be different. Tool rolls according to the present invention may alternatively include areas in which the mold cavities differ that are not uniformly shaped and/or that do not extend around the circumference of the tool roll.

Although the wires illustrated above include substantially rectangular cross-sections (taken transverse to the lengths of the wires), it may be preferred to use wires with other cross-sections as discussed in U.S. Pat. No. 6,190,594 (Gorman et al.).

Figure 12:
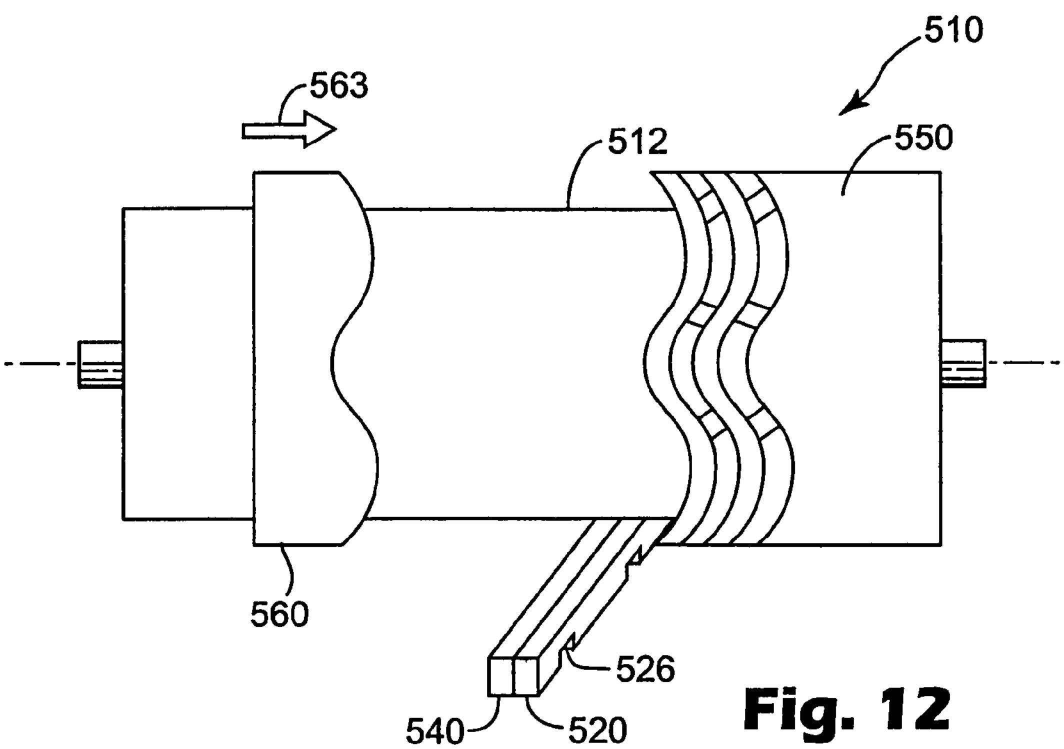
FIG. 12 illustrates one method of manufacturing a tool roll according to the present invention.

FIG. 12 illustrates one process of winding a base roll 512 with a wire 520 including voids 526 and a spacer wire 540 to provide a tool roll 510 including a plurality of mold cavities 530. It will be understood that more than two wires may be wound together if so desired. It may be desirable to provide a compression mold 560 to periodically compress the wound wires 520 and 540 against the wire winding surface 550 such that the helical coils take on the desired undulating profile discussed above. The compression mold 560 acts in the direction 563 and may be used at any desired time interval. For example, it may be desirable to apply compression to the windings after wrapping only a fraction of one winding, after multiple windings, or at any randomly selected time. Further, it may be desirable to use any suitable in addition to compression to maintain the windings in the desired shape. For example, it may be preferred to periodically spot weld the wound wires during compression, apply adhesive to the wound wires, etc.

Figure 13:
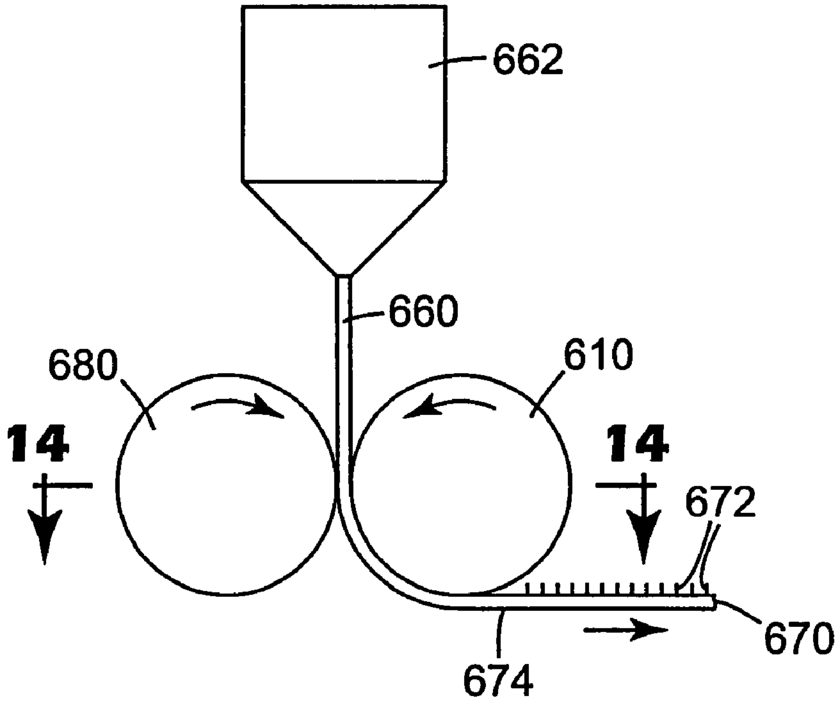
FIG. 13 illustrates one method of manufacturing a high aspect topology film using a tool roll according to the present invention.

FIG. 13 illustrates one process in which a tool roll 610 according to the present invention can be used to form a high aspect topology film. A moldable material 660 can be applied to the surface of the tool roll 610 by, e.g., extrusion or cast molding to create a film 670 including protrusions 672 that are replicas of the mold cavities in the tool roll 610. In preferred embodiments, adhesion of the material 660 to the tool roll 610 is less than the cohesion within the material 660 at the time of removal from the tool roll 610. It may be further preferred that the adhesion of the material 660 to the tool roll not exceed the tensile strength of the wire or wires used to form the tool roll 610.

Substantially any moldable material may be used in connection with the present invention. It may be preferred that the moldable material be a thermoplastic resin. Thermoplastic resins that can be extrusion molded and should be useful include polyesters such as poly(ethylene terephthalate), polyamides such as nylon, poly(styrene-acrylonitrile), poly(acrylonitrile-butadiene-styrene), polyolefins such as polypropylene, and plasticized polyvinyl chloride. One preferred thermoplastic resin is a medium impact copolymer of polypropylene and polyethylene having a melt flow index of 15, that is available as 7C05N from Union Carbide, Danbury, Conn. The thermoplastic resin may also comprise blends, including polyethylene and polypropylene blends, co-polymers, such as polypropylene-polyethylene co-polymers, or coextruded as multiple layers or in alternating zones. Additives such as plasticizers, fillers, pigments, dyes, anti-oxidants, release agents, and the like may also be incorporated into the moldable material.

In one preferred process, the material 660 is provided by extrusion into a nip formed by the tool roll 610 and a backup roll 680. The backup roll 680 preferably provides some pressure to assist in forcing the moldable material 660 into the mold cavities 630 (see FIG. 12) provided in the tool roll 610. Alternatively, the backup roll 680 may be replaced by any continuously moving surface that can assist in forcing the mold material into the mold cavities in tool roll 610.

The interior of the tool roll 610 may be supplied with a vacuum to assist in removal of air that may otherwise interfere with complete filling of the mold cavities. However, in many instances, no vacuum may be supplied as the air within the mold cavities escapes between the wires used to manufacture the tool roll 610. In other words, the process may be performed in the absence of a vacuum.

It may also be desirable to provide some thermal control in either or both of the tool roll 610 and the backup roll 680. Depending on process conditions, temperatures of the moldable material 660, properties of the moldable material 660, etc. it may be desirable to either heat one or both of the rolls 610 and 680, cool one or both of the rolls 610 and 680, or heat one of the rolls and cool the other roll.

After the material 660 is forced within the mold cavities in tool roll 610 and has sufficiently cooled to form a film 670 with protrusions 672 that can maintain the desired shape or shapes, it is stripped from the tool roll 610 for further processing or the film 670 can be wound into rolls. For example, if mechanical fastener strips are desired, the film 674 may be directed into a station or stations to modify the protrusions, coat adhesives, and perform other processing as discussed in, e.g., U.S. Pat. No. 5,845,375 (Miller et al.), U.S. Pat. No. 5,077,870 (Melbye et al.), PCT Publication Nos. WO 98/57565; WO 98/57564; WO 98/30381; and WO 98/14086.

It may be desirable to direct one or more additional materials into the nip formed by the tool roll 610 and backup roll 680 to provide desired additional properties to the film 670. For example, a woven or nonwoven web may be directed into the nip. Alternatively, the film 670 may be laminated to one or more additional layers by, e.g., heat, adhesives, coextrusion, etc.

Figure 14:
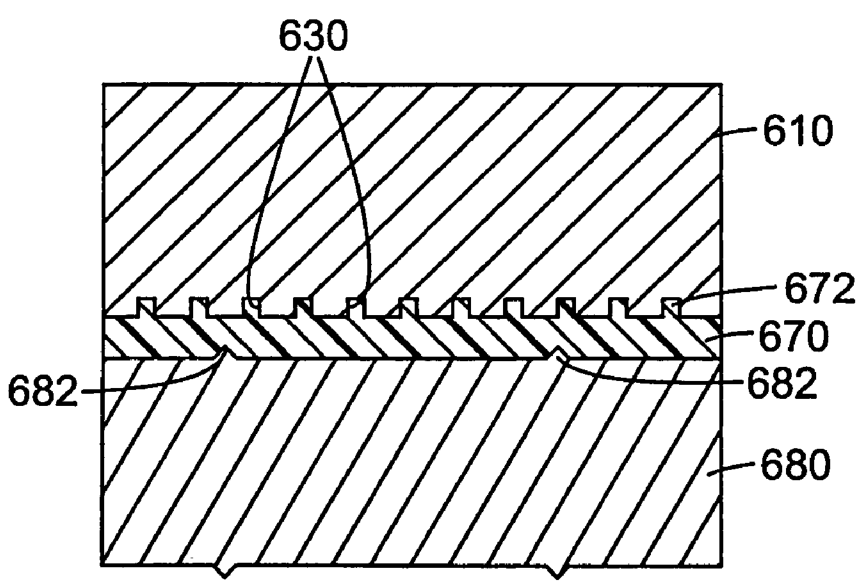
FIG. 14 is a cross-sectional view of the apparatus of FIG. 13, taken along line 14—14 in FIG. 13.

FIG. 14 is a cross-sectional view of the apparatus of FIG. 13 taken along line 14—14 in FIG. 13. The tool roll 610 includes mold cavities 630 filled by the moldable material to form protrusions 672 on film 670. Also illustrated in FIG. 14 are two raised structures 682 formed on the backup roll 680. One advantage of the raised structures 682 on the illustrated backup roll 680 is that each of the raised structures may create a line or zone of weakness along which the film 670 can be separated. The raised structures 682 are, however, optional and need not be provided in connection with the present invention.

Another optional feature that may be incorporated into the backup roll 680 is the addition of some structure to the surface of the roll 680 to increase its surface area. The increased surface area on the backup roll 680 can increase the surface area on the film 670, thereby improving adhesion of any adhesives provided on the back side 674 of the film 670. One example of useful structure could be a micro-embossed pattern of linear prisms on the scale of about 400 lines per inch (160 lines per centimeter).

Figure 15:
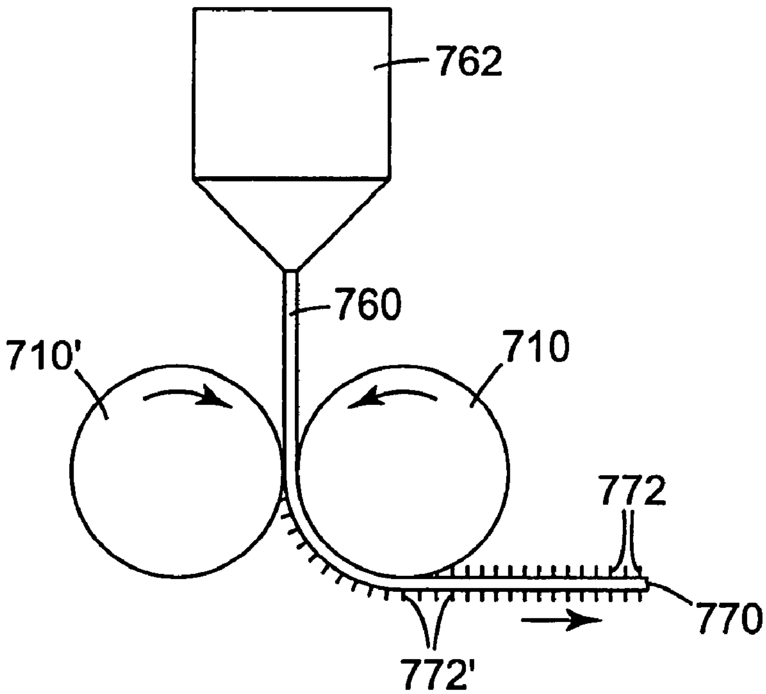
FIG. 15 illustrates one method of manufacturing a high aspect topology film including protrusions on both sides using two tool rolls according to the present invention.

FIG. 15 illustrates another process using wire-wound tool rolls with mold cavities formed therein. The illustrated process forms a film 770 having protrusions 772 extending from one side thereof and protrusions 772' extending from the opposite side of the film 770. The two-sided film 770 is formed by opposing tool rolls 710 and 710', both of which include mold cavities formed therein. The protrusions 772 and 772' may have the same characteristics in terms of size, shape, orientation, etc. or they may be different.

Figure 16:
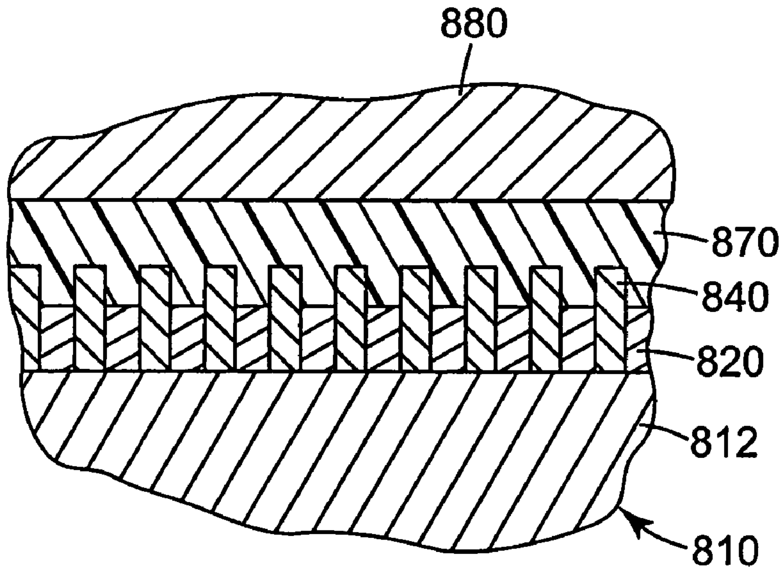
FIG. 16 is an enlarged partial cross-sectional view of a process using another tool roll according to the present invention.

FIG. 16 is an enlarged cross-sectional view of the interface of another tool roll 810 with a backup roll 880. Film 870 is located between the two rolls 810 and 880 and one surface of the film 870 is formed with a series of substantially continuous ridges formed thereon that are essentially negative images of the structure on the tool roll 810.

Tool roll 810 is formed by wires 820 and 840 which are helically wound around a base roll 812. Wire 840 has a taller profile than the other wire 820, resulting in a tool roll 810 on which grooves are formed between windings of wire 840. Although wires 820 and 840 are disclosed as having generally rectangular profiles, they could alternately be provided with a different shape, in which case the film 870 would also be formed with a different shape than that illustrated in FIG. 14. Furthermore, it will be understood that two tool rolls could be used in a process similar to that depicted in FIG. 15 to form a film with structures or protrusions on both major sides of the film.

Figure 17:
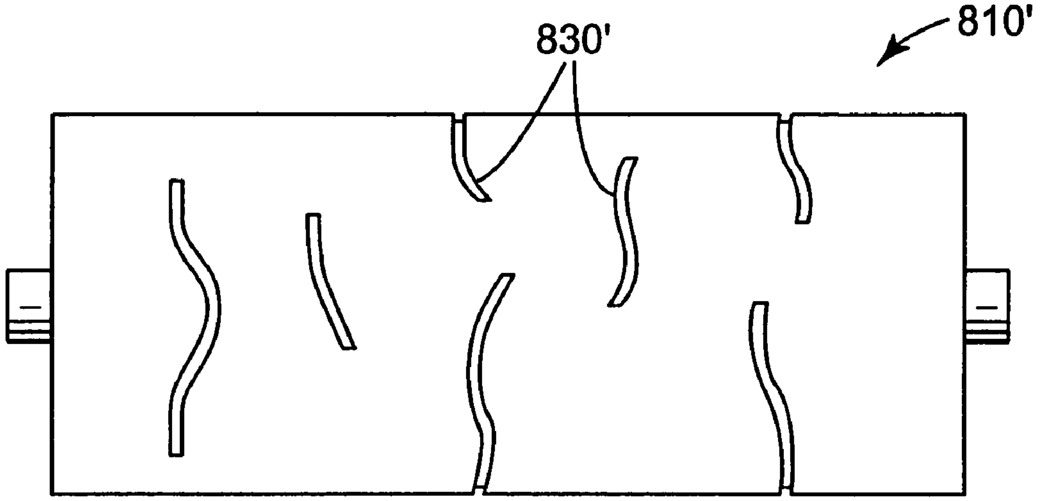
FIG. 17 is a plan view of another tool roll including elongated discontinuous helical mold cavities.

Although the grooves formed by the wires 820 and 840 wrapped around the tool roll 810 of FIG. 16 may be continuous around the circumference of the roll 810, they may also be discontinuous. FIG. 17 is a plan view of a tool roll 810' including mold cavities 830' that extend for some length around the tool roll 810', but are not formed in a continuous helical groove as discussed above with respect to FIG. 16. The elongated mold cavities 830' can be formed by wires including voids formed therein as discussed above. The voids in the wires used in roll 810' will, however, extend for longer distances over the length of the wires.

These elongated voids may be uniformly sized and spaced as depicted in the tool rolls above, or they may be non-uniformly sized and non-uniformly spaced. Tool roll 810' illustrates a wire with non-uniformly sized and spaced voids that, when wrapped around a base roll, forms non-uniformly sized and spaced mold cavities 830'.

Figure 18:
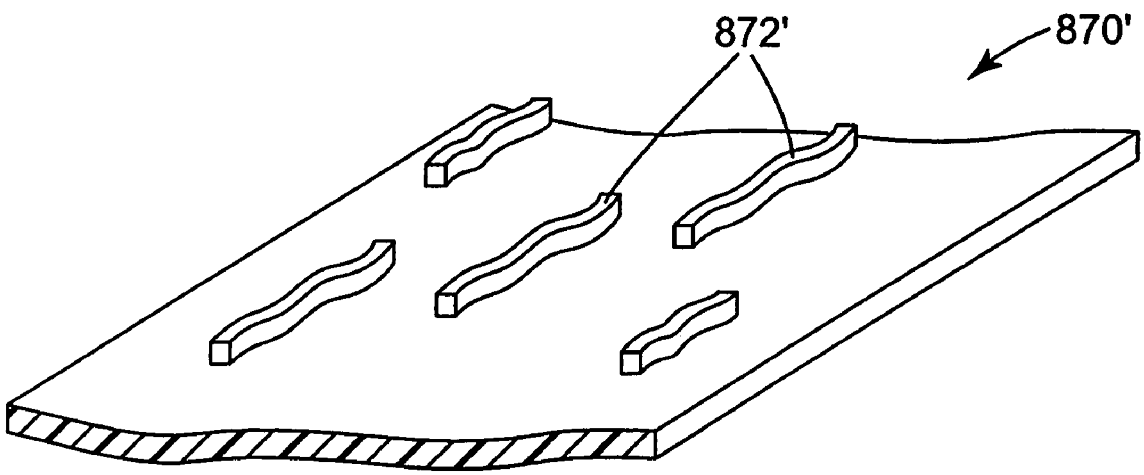
FIG. 18 is a perspective view of a film manufactured using the tool roll of FIG. 17.

The film produced by a roll such as tool roll 810' will include elongated protrusions 872' as illustrated in FIG. 18. Because the mold cavities 830' in roll 810' are non-uniformly sized and spaced, the elongated protrusions 872' are also non-uniformly sized and spaced.

All patents, patent applications, and publications cited herein are each incorporated herein by reference in their entirety, as if individually incorporated by reference. Various modifications and alterations of this invention will become apparent to those skilled in the art without departing from the scope of this invention, and it should be understood that this invention is not to be unduly limited to the illustrative embodiments set forth herein.

What is claimed is:

1. A method of forming a structured surface on an article, the method comprising:

providing a tool roll comprising a cylindrical base roll comprising first and second ends spaced apart along a longitudinal axis, a first wire comprising a plurality of first voids formed therein, the first wire being wound in helical coils around the base roll, wherein the plurality of first voids in the first wire form a plurality of first cavities, each cavity of the plurality of first cavities comprising an opening at an outer surface of the tool roll, wherein a distance between the first wire and a reference plane transverse to the longitudinal axis of the base roll sequentially increases and decreases at least once when moving in one direction about a circumference of the base roll;

contacting a moldable material to the outer surface of the tool roll to form the structured surface using the outer surface of the tool roll, the moldable material at least partially filling at least some of the first cavities; and removing the structured surface from the outer surface of the tool roll, wherein the structured surface comprises a plurality of protrusions corresponding to the plurality of first cavities.

2. A method according to claim 1, wherein the distance between the first wire and the reference plane sequentially increases and decreases two or more times when moving in one direction about the circumference of the base roll.

3. A method according to claim 1, wherein the distance between the first wire and the reference plane sequentially increases and decreases in a uniform pattern when moving in one direction about the circumference of the base roll.

4. A method according to claim 1, wherein the distance between the first wire and the reference plane sequentially increases and decreases in a non-uniform pattern when moving in one direction about the circumference of the base roll.

5. A method according to claim 1, wherein the first wire forms a sinusoidal helical pattern about the circumference of the roll.

6. A method of forming a structured surface on an article, the method comprising:

providing a tool roll comprising a cylindrical base roll comprising first and second ends spaced apart along a longitudinal axis, a first wire wound in helical coils around the base roll, wherein a distance between the first wire and a reference plane transverse to the longitudinal axis of the base roll sequentially increases and decreases at least once when moving in one direction about a circumference of the base roll, a second wire wound in helical coils around the base roll, wherein the second wire is located between adjacent helical coils of the first wire, and wherein the helical coils of the first and second wires alternate along the longitudinal axis, and further wherein a height of the first wire above the base roll is less than a height of the second wire above the base roll, whereby a helical groove is formed on an outer surface of the tool roll, the helical groove conforming to the shape of the first wire;

contacting a moldable material to the outer surface of the tool roll to form a structured surface on an article using the outer surface of the tool roll, the moldable material at least partially filling at least a portion of the helical groove formed by the first and second wires; and removing the structured surface from the tool roll, wherein the structured surface comprises a series of ridges.

7. A method according to claim 6, wherein the helical groove is substantially continuous about and along the outer surface of the tool roll.

8. A method according to claim 6, wherein the distance between the first wire and the reference plane sequentially increases and decreases two or more times when moving in one direction about the circumference of the base roll.

9. A method according to claim 6, wherein the distance between the first wire and the reference plane sequentially increases and decreases in a uniform pattern when moving in one direction about the circumference of the base roll.

10. A method according to claim 6, wherein the distance between the first wire and the reference plane sequentially increases and decreases in a non-uniform pattern when moving in one direction about the circumference of the base roll.

11. A method according to claim 6, wherein the first wire forms a sinusoidal helical pattern about the circumference of the roll.

* * * * *